Aug. 28, 1945.   W. L. MAYO   2,383,876
IGNITION SYSTEM FOR INTERNAL-COMBUSTION ENGINES
Filed Oct. 26, 1944   2 Sheets-Sheet 2
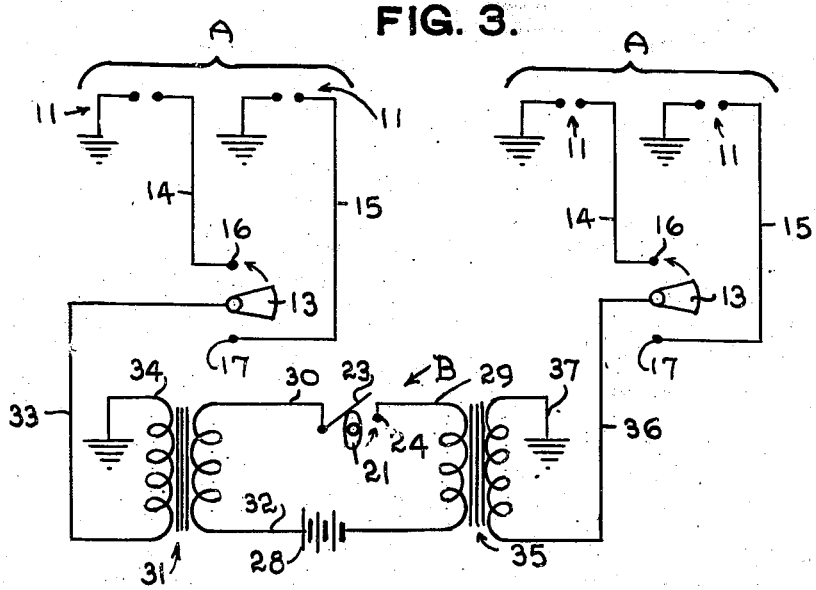
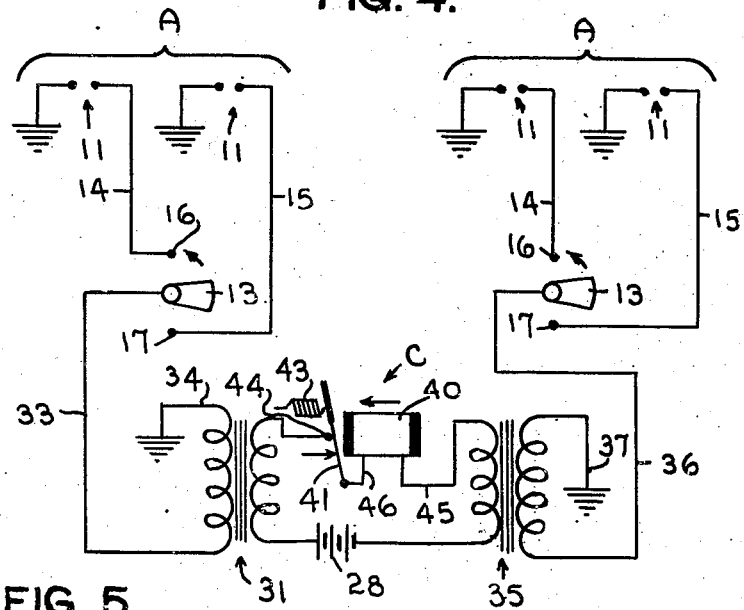
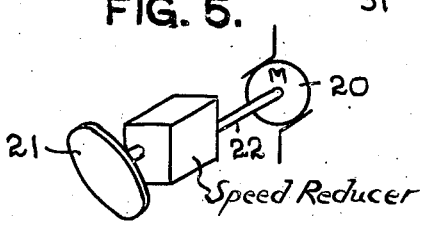
INVENTOR.
Wilbur L. Mayo
BY
ATTORNEYS.

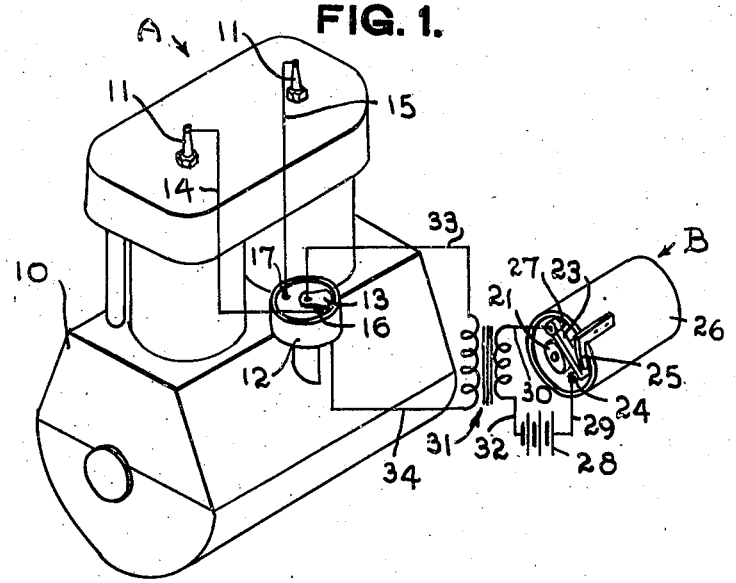
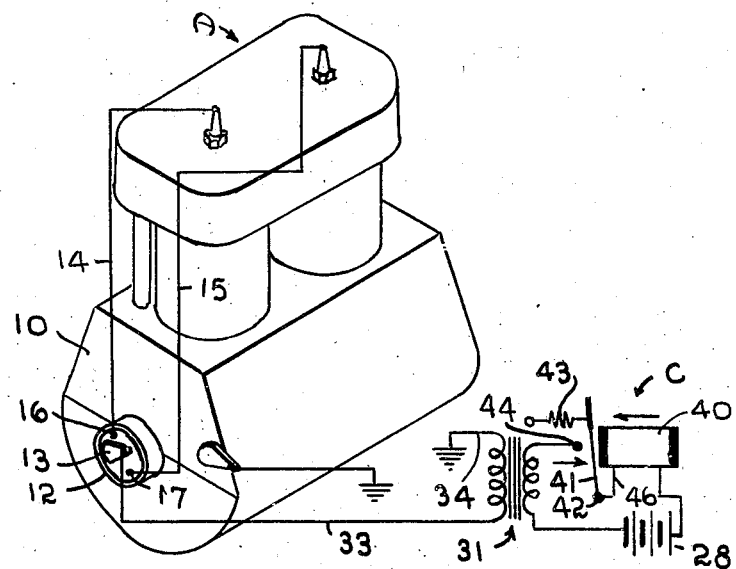

Patented Aug. 28, 1945

2,383,876

UNITED STATES PATENT OFFICE 2,383,876

IGNITION SYSTEM FOR INTERNAL-COMBUSTION ENGINES

Wilbur L. Mayo, Hampton, Va.

Application October 26, 1944, Serial No. 560,452

5 Claims. (Cl. 60—97)

This invention relates to speed control systems for devices employing timed explosive charges for their operation, such as internal combustion engines.

Due to mechanical difficulties there is a definite limit to the speed regulation which may be secured with inertia and velocity governors. With the view of attaining better speed regulation, previous art has developed exact control differential governors according to angular shift of the controlled device with respect to a controlling device. Generally the controlling device can be classified as belonging to one of two groups. It may be of the same type as the controlled device in the event that the object is to attain synchronization of devices, as engines, without regard to any special necessity for uniformity of the absolute speed of the devices. If, on the other hand, the object is not simply to synchronize more or less similar devices, as motors, but to attain maximum speed uniformity for one or more motors, then the controlling motor is apt to be small, unloaded, and of a type with marked constant speed characteristics.

There are some installations, such as multi-motor model airplanes, for which the weight and space limitations are such that it is not very practical to connect the controlled motors with the controlling motor by means of shafting and differential gearing. Nor is it more practical to use the differential gearing arrangement with shafting between the motors, and the differential gearing eliminated through use of an electric generator at the motor, coupled to a synchronous electric motor at the differential gearing. One object and advantage of this invention is that, without the addition of excess shafting and gearing, differential governor action can be effected by simple electrical connection between controlled internal combustion engines and their controlling engine or motor.

Where the object of the differential governor is to attain a very uniform speed, the controlling motor is usually unloaded and relatively free from the load variations which tend to cause change of speed of the controlled motor. However, the controlling motor is not entirely free from variation of the load on the controlled motor in that some power must be supplied to the differential gear in order to adjust the controls of the controlled motor according to the load imposed on it. This situation has led to the invention of systems providing means for controlling the controlling motor in such manner as to minimize the effects of the differential gear loads imposed upon it. This invention has an advantage not presented by previous differential governors in that variation of the load on the controlled motor is not in any way transmitted to the controlling or master motor. The significance of this advantage is that a more uniform speed can be secured with simpler mechanism.

Previous differential governors have required that there be provided a controlling rotating shaft or motor. In my invention the entire function of the controlling motor relative to the controlled motor is to generate electrical impulses. Thus, the system herein disclosed is unique in that a vibrator or other source of electrical impulses may be substituted for the controlling motor. The attendant simplification and improvement provides for a compact, light-weight speed-control system, comprising but few parts and none of these parts complicated.

Other objects and advantages of the invention will be apparent during the course of the following detailed description of the invention, taken in connection with the accompanying drawings, forming a part of this specification, and in which drawings—

Figure 1 is a view, partly in perspective and partly diagrammatic, of an internal combustion engine and one embodiment of the invention associated therewith.

Figure 2 is a similar view, but with a modified embodiment of the novel system associated therewith.

Figure 3 is a diagrammatic showing of the system of Figure 1 applied to two engines.

Figure 4 is a diagrammatic view of the system of Figure 2 applied to a pair of engines.

Figure 5 is a partly diagrammatic view of a switch operating means associated with the system of Figures 1 and 3.

In the drawings, wherein for the purpose of illustration are shown preferred and modified embodiments of the invention, the letter A designates generally a controlled device, as an internal combustion engine; the letter B the system including an electric motor; and C, the system including an electric vibrator.

The controlled device A, shown as an internal combustion engine, includes a block or frame 10, spark plugs 11 carried by the block, and a conventional distributor 12, having a rotor 13 which may be operatively connected, as by gears, with the engine's crankshaft, or be directly connected to the crankshaft. Conductors 14 and 15 are provided between the spark plugs 11 and spaced apart contacts 16 and 17 of the distributor 12.

In the novel system herein disclosed, the conventional battery, transformer or spark coil, and condenser associated with the ignition system of the internal combustion engine may be eliminated, or employed for initial ignition.

It is well to state that the engine A must be one selected for the approximate maximum load which will be imposed upon it. The novel system requires an engine throttle opening equal to the maximum which would occur during operation with a conventional throttle governor. Therefore, it is desirable to select a conservatively rated engine which will not be required to operate at maximum power. This is both economical and for the best interests of the system.

It is also desirable to employ a distributor rotor 13 of the wider conventional type, found best adapted for facilitating adjustment and construction thereof. Such a rotor is desirable in this novel system so that contact will be maintained over considerable angular range. Obviously, the distributor should be one which will not complete the circuit to a particular spark plug during the compression stroke of the piston in the cylinder containing such plug. In Figure 2 the distributor rotor 13 is shown as mounted directly on the crankshaft by the controlled device (which may be a two-cycle internal combustion engine). However, the exact location, mounting and operative connection of the distributor with the engine crankshaft, or the like, is not particularly important in connection with this system.

The novel system B, shown in Figures 1, 3 and 5, includes a suitable device 20, as a small constant-speed motor, which need not have power above that required to rotate a cam member 21 against the weight and frictional engagement of a movable contact or switch arm 23, riding upon the cam surface of the member 21. This cam member may be of dielectric material, operatively connected with the motor 20, as by conventional speed reduction gearing.

Upon rotation of the cam member 21, the switch arm 23 alternately and rhythmically makes and breaks an electric circuit, by engaging and separating from a fixed contact 24. A suitable resilient means, as the leaf spring 25, may be provided to bear upon the switch arm 23 to urge it toward the cam member 21.

The fixed contact 24 and spring 25 may be carried by and suitably insulated from a housing 26, which may also house the motor 20, and this housing 26 may also support the pivot 27, of dielectric material, for the switch arm 23.

From a source of electric energy, as the storage battery 28, extends an electric conductor 29 to the fixed contact 24, while a second electric conductor 30 extends from the switch arm 23 to the low tension side of a spark coil or transformer 31, from which side, also, an electric conductor 32 connects with the battery 28. The high-tension side of the transformer 31 is connected with the rotor 13 by electric conductor 33, a ground wire or conductor 34 also being provided for this side.

With this novel governing system, the engine throttle is opened more than is the case of the ordinary ignition system, and the engine operates at slightly retarded spark. If the engine starts to slow, the cycles of the engine occupy a slightly greater time period, so that, with the timing of the spark impulse independent of the engine speed, any slowing of the engine is accompanied by an earlier occurrence of the spark impulse with respect to the beginning of the next cycle. Since the engine is operating at slightly retarded spark, the effective advance of spark will result in increased power for the purpose of correcting the slowing tendency. If the engine starts to accelerate, the cycles of the engine occupy slightly smaller time periods so that, with the timing of the spark impulse independently of the engine speed, any speeding of the engine will be accompanied by a later occurrence of the spark impulse with respect to the beginning of successive cycles. This effective retardation of the spark results in a decrease of power and correction of the speeding up tendency.

In the event it is desired to control and synchronize the speed of a plurality of controlled devices A, the modification shown diagrammatically in Figure 3 may be employed, where a second spark coil or transformer 35 is interposed in the line 29 to the battery 28, with the high tension side of the second transformer 35 connected to the rotor 13 of the distributor 12 of a second engine A, by conductor 36, and the second transformer grounded, of course, as at 37.

The modified system C, shown in Figures 2 and 4, substitutes a vibrator in place of the motor-operated switch means of the system B. Otherwise the system, either with respect to one controlled device A or a plurality of controlled devices A, is the same as described wherein the motor-operated switch means is employed.

The vibrator includes an electro-magnet 40, adapted to attract, when energized, switch arm 41, pivoted at 42.

A retraction coil spring 43, or the like, urges the arm 41 toward and into engagement with a fixed contact 44. With respect to conductors, reference characters similar to those in the system B are employed to designate corresponding parts in the system C. The spring 43 is not powerful enough to counteract the pull of the energized electromagnet. It is obvious that, when the electromagnet 40 is energized the switch arm 41 is drawn toward it, breaking the circuit at contact 44. This deenergizes the electromagnet and permits spring 43 to draw the switch arm 41 into engagement with the contact 44. Thus, alternately, in a rhythmic way, current flows and ceases in the transformer 31 and by this action, intermittent low potential current thru the electromagnet circuit induces rhythmic high potential impulses for the distributor circuit, wholly independent of any rotating portion of the engine.

In the speed synchronizing of several engines, employing the vibrator system, in Figure 4 it will be seen that a second transformer or spark coil 35 is provided, interposed in the circuit between the battery 28 and electromagnet 40, with the high tension side of the transformer 35 electrically connected, as by the conductor 36, to the rotor of the distributor associated with the second engine. From the low tension side of this transformer, a conductor 45 leads to the windings of the electromagnet 40, and a second conductor 46 from the windings of the electromagnet to the movable contact 41.

From the foregoing it is apparent that the speed of one or a plurality of controlled devices of the class described, may be regulated wholly independently of the rotating parts of the controlled devices. Thus, in the case of two or more controlled devices, all will be synchronized and their speed will be constant, all with the employment of but few parts and all of those compact and, due to conductor connection only with the controlled device or devices, the novel system may be installed in any available space or location.

Various changes may be made to the forms of the invention herein shown and described without departing from the spirit of the invention or scope of the claims.

What is claimed is:

1. A constant speed system for an internal combustion engine having, associated therewith, a distributor, provided with a rotor operatively connected with a rotating portion of said engine, said system comprising an electric switch having a fixed contact and a movable contact, means wholly independent of the speed of said engine for rhythmically opening and closing said switch, a spark coil electrically connected to one of said contacts, a source of electric energy electrically connected with said coil and with the other of said contacts, and an electric conductor from the high tension side of said coil to said rotor.

2. A constant speed system for an internal combustion engine having, associated therewith, a distributor, provided with a rotor operatively connected with a rotating portion of said engine, said system comprising an electric switch having a fixed contact and a movable contact, means wholly independent of the speed of said engine for rhythmically opening and closing said switch, including a rotating cam member, engaging said movable contact, and a motor operatively connected with said cam, a spark coil electrically connected to one of said contacts, a source of electric energy electrically connected with said coil and with the other of said contacts, and an electric conductor from the high tension side of said coil to said rotor.

3. A constant speed system for an internal combustion engine having, associated therewith, a distributor, provided with a rotor operatively connected with a rotating portion of said engine, said system comprising an electric switch having a fixed contact and a movable contact, means wholly independent of the speed of said engine for rhythmically opening and closing said switch, including an electromagnet disposed to attract said movable contact, a spark coil electrically said contacts, a second spark coil, a source of electric energy electrically connected with said coil and with the other of said contacts, and an electric conductor from the high tension side of said coil to said rotor.

4. A constant speed system for a pair of internal combustion engines, each having a distributor associated therewith, said distributor being provided with a rotor operatively connected with a rotating portion of its engine, said system comprising a single electric switch having a fixed contact and a movable contact, means wholly independent of the speed of said engines for rhythmically opening and closing said switch, a spark coil electrically connected with one of said contacts, a second spark coil, a source of electric energy connected with the low tension side of each of said coils, an electric conductor from the low tension side of said second-named coil to the other of said contacts, an electric conductor from the high tension side of said first-named coil to one of said rotors, and an electric conductor from the high tension side of the other of said coils to the other of said rotors.

5. A constant speed system for a pair of internal combustion engines, each having a distributor associated therewith, said distributor being provided with a rotor operatively connected with a rotating portion of its engine, said system comprising a single electric switch having a fixed contact and a movable contact, means wholly separated from the rotating portions of said engines for rhythmically opening and closing said switch, a spark coil electrically connected with one of said contacts, a second spark coil, a source of electric energy connected with the low tension side of each of said coils, an electric conductor from the low tension side of said second-named coil to the other of said contacts, an electric conductor from the high tension side of said first-named coil to one of said rotors, and an electric conductor from the high tension side of the other of said coils to the other of said rotors.

WILBUR L. MAYO.

CERTIFICATE OF CORRECTION.

Patent No. 2,383,876.                                        August 28, 1945.

WILBUR L. MAYO.

It is hereby certified that error appears in the printed specification of the above numbered patent requiring correction as follows: Page 3, second column, line 2, after "electrically" insert the words "connected to one of--; and that the said Letters Patent should be read with this correction therein that the same may conform to the record of the case in the Patent Office.

Signed and sealed this 18th day of December, A. D. 1945.

Leslie Frazer (Seal)                         First Assistant Commissioner of Patents.